United States Patent
de Juan, Jr. et al.

(10) Patent No.: US 9,851,586 B2
(45) Date of Patent: *Dec. 26, 2017

(54) CONTACT LENSES HAVING A REINFORCING SCAFFOLD

(71) Applicant: NexisVision, Inc., Menlo Park, CA (US)

(72) Inventors: Eugene de Juan, Jr., San Francisco, CA (US); Cary J. Reich, Los Gatos, CA (US); Matt Clarke, Mountain View, CA (US); Kuangmon Ashley Tuan, Mountain View, CA (US); Raymond Lum, El Cerrito, CA (US); Jose D. Alejandro, Sunnyvale, CA (US)

(73) Assignee: NexisVision, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,442

(22) Filed: Apr. 12, 2016

(65) Prior Publication Data

US 2016/0223835 A1 Aug. 4, 2016

Related U.S. Application Data

(63) Continuation of application No. 14/539,698, filed on Nov. 12, 2014, now Pat. No. 9,341,864.

(Continued)

(51) Int. Cl.
*G02C 7/04* (2006.01)

(52) U.S. Cl.
CPC ............. *G02C 7/049* (2013.01); *G02C 7/047* (2013.01); *G02C 2202/16* (2013.01)

(58) Field of Classification Search
CPC .................................. G02C 7/02; G02C 7/049
(Continued)

(56) References Cited

U.S. PATENT DOCUMENTS

| 2,641,161 A | 6/1953 | Silverstein |
| 3,246,941 A | 4/1966 | Moss |

(Continued)

FOREIGN PATENT DOCUMENTS

| CA | 993401 A1 | 7/1976 |
| CA | 2174967 C | 5/1995 |

(Continued)

OTHER PUBLICATIONS

Alio, Jorge L. et al. "Contact lens fitting to correct irregular astigmatism after corneal refractive surgery," Journal of Cataract & Refractive Surgery, vol. 28, No. 10, pp. 1750-1757, Oct. 2002.

(Continued)

*Primary Examiner* — Darryl J Collins

(57) ABSTRACT

Ophthalmic lenses for correcting refractive error of an eye are disclosed. Ophthalmic lenses include an inner optic portion having a scaffold between an anterior portion and a posterior portion. The scaffold is characterized by a substantially uniform thickness formed from a material characterized by a modulus that his higher than the modulus of the peripheral portion. Openings within the scaffold are filled with a low modulus material. When applied to an eye, the lenses are configured to provide one or more lenticular volumes between the posterior surface of the lens and the cornea. The disclosure further relates to methods of correcting refractive errors of an eye such as astigmatism or spherical aberration using the ophthalmic lenses.

20 Claims, 6 Drawing Sheets

Related U.S. Application Data

(60) Provisional application No. 61/904,992, filed on Nov. 15, 2013.

(58) Field of Classification Search
USPC .................................... 351/159.02, 159.34
See application file for complete search history.

(56) References Cited

U.S. PATENT DOCUMENTS

| | | |
|---|---|---|
| 3,488,111 A | 1/1970 | Isen |
| 3,489,491 A | 1/1970 | Creighton |
| 3,495,899 A | 2/1970 | Biri |
| 3,594,074 A | 7/1971 | Rosen |
| 3,619,044 A | 11/1971 | Kamath |
| 3,688,386 A | 9/1972 | Pereira |
| 3,833,786 A | 9/1974 | Brucker |
| 3,915,609 A | 10/1975 | Robinson |
| 3,944,347 A | 3/1976 | Barkdoll et al. |
| 3,973,837 A | 8/1976 | Page |
| 3,973,838 A | 8/1976 | Page |
| 4,037,866 A | 7/1977 | Price |
| 4,053,442 A | 10/1977 | Jungr et al. |
| 4,068,933 A | 1/1978 | Seiderman |
| 4,071,272 A | 1/1978 | Drilik |
| 4,121,885 A | 10/1978 | Erickson et al. |
| 4,166,255 A | 8/1979 | Graham |
| 4,171,878 A | 10/1979 | Kivaev et al. |
| 4,194,815 A | 3/1980 | Trombley |
| 4,200,320 A | 4/1980 | Durham |
| 4,208,362 A | 6/1980 | Ceichert et al. |
| 4,211,476 A | 7/1980 | Brummel et al. |
| 4,268,133 A | 5/1981 | Fischer et al. |
| 4,312,575 A | 1/1982 | Peyman et al. |
| 4,381,007 A | 4/1983 | Doss |
| 4,487,905 A | 12/1984 | Mitchell |
| 4,621,912 A | 11/1986 | Meyer |
| 4,640,594 A | 2/1987 | Berger |
| 4,666,249 A | 5/1987 | Bauman et al. |
| 4,666,267 A | 5/1987 | Wickterle |
| 4,701,288 A | 10/1987 | Cook et al. |
| 4,772,283 A | 9/1988 | White |
| 4,806,382 A | 2/1989 | Goldberg et al. |
| 4,810,082 A | 3/1989 | Abel, Jr. |
| 4,886,350 A | 12/1989 | Wichterle |
| 4,890,911 A | 1/1990 | Sulc et al. |
| 4,909,896 A | 3/1990 | Ikushima et al. |
| 4,940,751 A | 7/1990 | Frances et al. |
| 4,943,150 A | 7/1990 | Deichert et al. |
| 4,952,045 A | 8/1990 | Stoyan |
| 4,978,481 A | 12/1990 | Janssen et al. |
| 4,981,841 A | 1/1991 | Gibson |
| 4,997,583 A | 3/1991 | Itzhak |
| 5,008,289 A | 4/1991 | Bernstein |
| 5,073,021 A | 12/1991 | Marron |
| 5,104,213 A | 4/1992 | Wolfson |
| 5,143,660 A | 9/1992 | Hamilton et al. |
| 5,152,786 A | 10/1992 | Hanna |
| 5,166,710 A | 11/1992 | Hofer et al. |
| 5,178,879 A | 1/1993 | Adekunle et al. |
| 5,191,365 A | 3/1993 | Stoyan |
| 5,213,720 A | 5/1993 | Civerchia |
| 5,236,236 A | 8/1993 | Girimont |
| 5,245,367 A | 9/1993 | Miller et al. |
| 5,246,259 A | 9/1993 | Hellenkamp et al. |
| 5,293,186 A | 3/1994 | Seden et al. |
| 5,346,491 A | 9/1994 | Oertli |
| 5,347,326 A | 9/1994 | Volk |
| 5,349,395 A | 9/1994 | Stoyan |
| 5,397,848 A | 3/1995 | Yang et al. |
| 5,428,412 A | 6/1995 | Stoyan |
| 5,433,714 A | 7/1995 | Bloomberg |
| 5,433,898 A | 7/1995 | Thakrar et al. |
| 5,434,630 A | 7/1995 | Bransome |
| 5,472,436 A | 12/1995 | Fremstad |
| 5,496,084 A | 3/1996 | Miralles Medan |
| 5,517,260 A | 5/1996 | Glady et al. |
| 5,538,301 A | 7/1996 | Yavitz et al. |
| 5,570,144 A | 10/1996 | Lofgren-Nisser |
| 5,578,332 A | 11/1996 | Hamilton et al. |
| 5,598,233 A | 1/1997 | Haralambopoulos et al. |
| 5,612,432 A | 3/1997 | Taniguchi et al. |
| 5,628,794 A | 5/1997 | Lindstrom |
| 5,632,773 A | 5/1997 | Graham et al. |
| 5,649,922 A | 7/1997 | Yavitz |
| 5,662,706 A | 9/1997 | Legerton et al. |
| 5,671,038 A | 9/1997 | Porat |
| 5,712,721 A | 1/1998 | Large |
| 5,732,990 A | 3/1998 | Yavitz et al. |
| 5,757,458 A | 5/1998 | Miller et al. |
| 5,760,100 A | 6/1998 | Nicolson et al. |
| 5,760,870 A | 6/1998 | Payor et al. |
| 5,804,263 A | 9/1998 | Goldberg et al. |
| 5,820,624 A | 10/1998 | Yavitz |
| 5,854,291 A | 12/1998 | Laughlin et al. |
| 5,869,533 A | 2/1999 | Holt |
| 5,885,597 A | 3/1999 | Botknecht et al. |
| 5,905,561 A | 5/1999 | Lee et al. |
| 5,910,512 A | 6/1999 | Conant |
| 5,923,397 A | 7/1999 | Bonafini, Jr. |
| 5,929,968 A | 7/1999 | Cotie et al. |
| 5,953,098 A | 9/1999 | Lieberman et al. |
| 5,957,921 A | 9/1999 | Mirhashemi et al. |
| 5,962,532 A | 10/1999 | Campbell et al. |
| 5,971,541 A | 10/1999 | Danker et al. |
| 5,980,040 A | 11/1999 | Xu et al. |
| 5,986,001 A | 11/1999 | Ingenito et al. |
| 6,010,219 A | 1/2000 | Stoyan |
| 6,030,974 A | 2/2000 | Schwartz et al. |
| 6,036,314 A | 3/2000 | Wolfson et al. |
| 6,036,688 A | 3/2000 | Edwards |
| 6,048,855 A | 4/2000 | De Lacharriere et al. |
| 6,075,066 A | 6/2000 | Matsuda et al. |
| 6,092,898 A | 7/2000 | De Juan, Jr. |
| 6,099,121 A | 8/2000 | Chapman et al. |
| 6,217,171 B1 | 4/2001 | Auten et al. |
| 6,244,709 B1 | 6/2001 | Vayntraub et al. |
| 6,248,788 B1 | 6/2001 | Robbins et al. |
| 6,325,509 B1 | 12/2001 | Hodur et al. |
| 6,340,229 B1 | 1/2002 | Lieberman et al. |
| 6,361,169 B1 | 3/2002 | Tung |
| 6,364,482 B1 | 4/2002 | Roffman et al. |
| 6,406,145 B1 | 6/2002 | Jubin |
| 6,474,814 B1 | 11/2002 | Griffin |
| 6,520,637 B2 | 2/2003 | Hodur et al. |
| 6,541,028 B1 | 4/2003 | Kuri-Harcuch et al. |
| 6,551,307 B2 | 4/2003 | Peyman |
| 6,568,808 B2 | 5/2003 | Campin |
| 6,579,918 B1 | 6/2003 | Auten et al. |
| 6,593,370 B2 | 7/2003 | Tamura et al. |
| 6,652,095 B2 | 11/2003 | Tung |
| 6,659,607 B2 | 12/2003 | Miyamura et al. |
| 6,726,322 B2 | 4/2004 | Andino et al. |
| 6,726,684 B1 | 4/2004 | Woloszko et al. |
| 6,779,888 B2 | 8/2004 | Marmo |
| 6,843,563 B2 | 1/2005 | Richardson |
| 6,849,671 B2 | 2/2005 | Steffen et al. |
| 6,880,558 B2 | 4/2005 | Perez |
| 6,951,894 B1 | 10/2005 | Nicolson et al. |
| 7,018,039 B2 | 3/2006 | Legerton et al. |
| 7,025,455 B2 | 4/2006 | Roffman |
| 7,080,905 B2 | 7/2006 | Marmo et al. |
| 7,097,301 B2 | 8/2006 | Legerton et al. |
| 7,104,648 B2 | 9/2006 | Dahi et al. |
| 7,150,529 B2 | 12/2006 | Legerton et al. |
| 7,163,292 B2 | 1/2007 | Dahi et al. |
| 7,193,124 B2 | 3/2007 | Coffee |
| 7,216,974 B2 | 5/2007 | Meyers et al. |
| 7,249,849 B2 | 7/2007 | Marmo et al. |
| 7,270,412 B2 | 9/2007 | Legerton et al. |
| 7,322,694 B2 | 1/2008 | Dahi et al. |
| 7,329,001 B2 | 2/2008 | Benrashid et al. |
| 7,338,160 B2 | 3/2008 | Lieberman et al. |
| 7,360,890 B2 | 4/2008 | Back |
| 7,377,637 B2 | 5/2008 | Legerton et al. |

(56) References Cited

U.S. PATENT DOCUMENTS

| | | |
|---|---|---|
| 7,401,922 B2 | 7/2008 | Legerton |
| 7,404,638 B2 | 7/2008 | Miller et al. |
| 7,461,937 B2 | 12/2008 | Steffen et al. |
| 7,491,350 B2 | 2/2009 | Silvestrini |
| 7,530,689 B2 | 5/2009 | Berke |
| 7,537,339 B2 | 5/2009 | Legerton et al. |
| 7,543,936 B2 | 6/2009 | Legerton et al. |
| 7,559,649 B2 | 7/2009 | Cotie et al. |
| 7,585,074 B2 | 9/2009 | Dahi et al. |
| 7,594,725 B2 | 9/2009 | Legerton et al. |
| 7,628,810 B2 | 12/2009 | Christie et al. |
| 7,682,020 B2 | 3/2010 | Berke |
| 7,695,135 B1 | 4/2010 | Rosenthal |
| 7,699,465 B2 | 4/2010 | Dootjes et al. |
| 7,717,555 B2 | 5/2010 | Legerton et al. |
| 7,735,997 B2 | 6/2010 | Muckenhirn |
| 7,748,844 B2 | 7/2010 | Lai |
| 7,762,668 B2 | 7/2010 | Dal et al. |
| 7,828,432 B2 | 11/2010 | Meyers et al. |
| 7,859,769 B2 | 12/2010 | Zalevsky |
| 7,976,577 B2 | 7/2011 | Silvestrini |
| 7,984,988 B2 | 7/2011 | Berke |
| 8,137,344 B2 | 3/2012 | Jia et al. |
| 8,201,941 B2 | 6/2012 | Choo et al. |
| 8,459,793 B2 | 6/2013 | De Juan, Jr. et al. |
| 8,485,662 B2 | 7/2013 | Collins et al. |
| 8,591,025 B1 | 11/2013 | de Juan, Jr. |
| 8,678,584 B2 | 3/2014 | de Juan |
| 9,107,773 B2 | 8/2015 | de Juan, Jr. |
| 9,395,558 B2 | 7/2016 | de Juan, Jr. |
| 2002/0095199 A1 | 7/2002 | West, Jr. et al. |
| 2002/0164484 A1 | 11/2002 | Jiang et al. |
| 2004/0015163 A1 | 1/2004 | Buysse |
| 2004/0088050 A1 | 5/2004 | Norrby et al. |
| 2004/0141150 A1 | 7/2004 | Roffman et al. |
| 2004/0170666 A1 | 9/2004 | Keates et al. |
| 2004/0184158 A1 | 9/2004 | Shadduck |
| 2004/0212779 A1 | 10/2004 | Dahi et al. |
| 2005/0033420 A1 | 2/2005 | Christie et al. |
| 2005/0107775 A1 | 5/2005 | Huang et al. |
| 2005/0213030 A1 | 9/2005 | Meyers et al. |
| 2005/0259221 A1 | 11/2005 | Marmo |
| 2005/0288196 A1 | 12/2005 | Horn |
| 2006/0077581 A1 | 4/2006 | Schwiegerling |
| 2006/0083773 A1 | 4/2006 | Myung |
| 2006/0100617 A1 | 5/2006 | Boukhny |
| 2006/0132707 A1 | 6/2006 | Tung |
| 2006/0152673 A1 | 7/2006 | Cotie et al. |
| 2006/0197909 A1 | 9/2006 | Legerton |
| 2006/0197910 A1 | 9/2006 | Legerton |
| 2006/0235514 A1 | 10/2006 | Silvestrini |
| 2006/0238712 A1 | 10/2006 | Dahi |
| 2006/0241751 A1 | 10/2006 | Marmo |
| 2006/0250576 A1 | 11/2006 | Legerton et al. |
| 2006/0256283 A1 | 11/2006 | Legerton |
| 2006/0256284 A1 | 11/2006 | Dahi |
| 2006/0285072 A1 | 12/2006 | Dahi et al. |
| 2006/0290882 A1 | 12/2006 | Meyers et al. |
| 2007/0013869 A1 | 1/2007 | Dahi |
| 2007/0014760 A1 | 1/2007 | Peyman |
| 2007/0037898 A1 | 2/2007 | Phelan et al. |
| 2007/0046894 A1 | 3/2007 | Muckenhirn |
| 2007/0106394 A1 | 5/2007 | Chen |
| 2007/0129720 A1 | 6/2007 | Demarias et al. |
| 2007/0132948 A1 | 6/2007 | Evans |
| 2007/0135915 A1 | 6/2007 | Klima |
| 2007/0182920 A1 | 8/2007 | Back et al. |
| 2007/0232755 A1 | 10/2007 | Matsushita et al. |
| 2007/0242216 A1 | 10/2007 | Dootjes et al. |
| 2007/0244559 A1 | 10/2007 | Shiuey |
| 2007/0273834 A1 | 11/2007 | Legerton |
| 2008/0039832 A1 | 2/2008 | Palanker et al. |
| 2008/0074611 A1 | 3/2008 | Meyers et al. |
| 2008/0100796 A1 | 5/2008 | Pruitt et al. |
| 2008/0243156 A1 | 10/2008 | John |
| 2008/0287915 A1 | 11/2008 | Rosenthal et al. |
| 2008/0291391 A1 | 11/2008 | Meyers et al. |
| 2009/0033864 A1 | 2/2009 | Shone et al. |
| 2009/0096987 A1 | 4/2009 | Lai et al. |
| 2009/0237612 A1 | 9/2009 | Cotie et al. |
| 2009/0244477 A1 | 10/2009 | Pugh et al. |
| 2009/0303442 A1 | 12/2009 | Choo et al. |
| 2010/0036488 A1 | 2/2010 | De Juan, Jr. et al. |
| 2010/0060849 A1 | 3/2010 | Hibino |
| 2010/0128224 A1 | 5/2010 | Legerton |
| 2010/0157250 A1 | 6/2010 | Berke |
| 2010/0208196 A1 | 8/2010 | Benrashid et al. |
| 2010/0271589 A1 | 10/2010 | Legerton et al. |
| 2011/0034854 A1 | 2/2011 | Neuberger et al. |
| 2011/0208300 A1 | 8/2011 | De Juan, Jr. et al. |
| 2012/0105804 A1 | 5/2012 | Legerton |
| 2012/0113386 A1 | 5/2012 | Back |
| 2012/0169994 A1 | 7/2012 | Matsushita et al. |
| 2012/0310133 A1 | 12/2012 | De Juan, Jr. et al. |
| 2012/0327362 A1 | 12/2012 | Doraiswamy et al. |
| 2013/0025606 A1 | 1/2013 | De Juan, Jr. et al. |
| 2013/0066283 A1 | 3/2013 | De Juan, Jr. et al. |
| 2013/0070200 A1 | 3/2013 | De Juan, Jr. et al. |
| 2013/0077044 A1 | 3/2013 | De Juan, Jr. et al. |
| 2013/0201442 A1 | 8/2013 | Back |
| 2013/0201443 A1 | 8/2013 | Back et al. |
| 2013/0201454 A1 | 8/2013 | Back |
| 2013/0208236 A1 | 8/2013 | McCabe et al. |
| 2013/0208237 A1 | 8/2013 | Hawke et al. |
| 2013/0222761 A1 | 8/2013 | Hansen et al. |
| 2013/0242255 A1 | 9/2013 | Caldarise et al. |
| 2013/0258276 A1 | 10/2013 | Hansen et al. |
| 2013/0278890 A1 | 10/2013 | de Juan et al. |
| 2013/0293832 A1 | 11/2013 | de Juan et al. |
| 2014/0028979 A1 | 1/2014 | de Juan et al. |
| 2014/0069438 A1 | 3/2014 | de Juan et al. |
| 2014/0069439 A1 | 3/2014 | de Juan et al. |
| 2014/0155800 A1 | 6/2014 | de Juan et al. |
| 2014/0251347 A1 | 9/2014 | de Juan et al. |
| 2014/0362338 A1 | 12/2014 | de Juan et al. |
| 2015/0055081 A1 | 2/2015 | de Juan et al. |
| 2015/0077701 A1 | 3/2015 | de Juan et al. |
| 2016/0067109 A1 | 3/2016 | de Juan et al. |
| 2016/0170233 A1 | 6/2016 | de Juan et al. |
| 2016/0223835 A1 | 8/2016 | de Juan et al. |

FOREIGN PATENT DOCUMENTS

| | | |
|---|---|---|
| DE | 3143839 A1 | 5/1983 |
| EP | 0042679 A2 | 12/1981 |
| EP | 0434205 A2 | 6/1991 |
| EP | 0574352 A1 | 12/1993 |
| EP | 0378512 A3 | 2/1995 |
| EP | 0378512 B1 | 2/1995 |
| EP | 0683416 A1 | 11/1995 |
| EP | 0985157 B1 | 12/1998 |
| EP | 1664907 A1 | 6/2006 |
| FR | 2330025 A1 | 5/1977 |
| GB | 2107895 A | 5/1983 |
| JP | S55101125 U | 7/1980 |
| JP | S5727456 Y2 | 6/1982 |
| JP | S5727457 Y2 | 6/1982 |
| JP | 2661909 B2 | 10/1997 |
| JP | H11151263 A | 6/1999 |
| JP | H11249048 A | 9/1999 |
| JP | 2004504105 A | 2/2004 |
| WO | 9014083 A1 | 11/1990 |
| WO | 9207617 A1 | 5/1992 |
| WO | 9307840 A1 | 4/1993 |
| WO | 9405225 A1 | 3/1994 |
| WO | 9513764 A1 | 5/1995 |
| WO | 9515134 A1 | 6/1995 |
| WO | 9627816 A1 | 9/1996 |
| WO | 9719381 A1 | 5/1997 |
| WO | 9803267 A1 | 1/1998 |
| WO | 9854603 A1 | 12/1998 |
| WO | 9930560 A1 | 6/1999 |
| WO | 9943354 A2 | 9/1999 |
| WO | 9943354 A3 | 9/1999 |

(56) References Cited

FOREIGN PATENT DOCUMENTS

| | | |
|---|---|---|
| WO | 9946631 A1 | 9/1999 |
| WO | 0009042 A1 | 2/2000 |
| WO | 0168082 A1 | 9/2001 |
| WO | 0206883 A2 | 1/2002 |
| WO | 0210841 A1 | 2/2002 |
| WO | 02068008 A1 | 9/2002 |
| WO | 03097759 A1 | 11/2003 |
| WO | 2004068196 A1 | 8/2004 |
| WO | 2004097502 A1 | 11/2004 |
| WO | 2004109368 A2 | 12/2004 |
| WO | 2005079290 A2 | 9/2005 |
| WO | 2005116729 A3 | 12/2005 |
| WO | 2006026666 A2 | 3/2006 |
| WO | 2006026666 A3 | 3/2006 |
| WO | 2006121591 A1 | 11/2006 |
| WO | 2006134649 A1 | 12/2006 |
| WO | 2007002231 A1 | 1/2007 |
| WO | 2007044513 A1 | 4/2007 |
| WO | 2007053297 A2 | 5/2007 |
| WO | 2007053297 A3 | 5/2007 |
| WO | 2009065061 A1 | 5/2009 |
| WO | 2009073213 A1 | 6/2009 |
| WO | 2006113149 A2 | 10/2009 |
| WO | 2006113149 A3 | 10/2009 |
| WO | 2009145842 A2 | 12/2009 |
| WO | 2010051172 A1 | 5/2010 |
| WO | 2010144317 A1 | 12/2010 |
| WO | 2011050327 A1 | 4/2011 |
| WO | 2011050365 A1 | 4/2011 |
| WO | 2012061160 A1 | 5/2012 |
| WO | 2012149056 A1 | 11/2012 |
| WO | 2013184239 A1 | 12/2013 |

OTHER PUBLICATIONS

Bausch & Lomb Inc., Boston® Materials & Solutions: Product Guide, 2009.
Bissen-Miyajima, Hiroko et al., "Role of the endothelial pump in flap adhesion after laser in situ keratomileusis," Journal of Cataract & Refractive Surgery, vol. 30, No. 9, pp. 1989-1992, Sep. 2004.
Schimmelpfenning, B. et al., "A technique for controlled sensory denervation of the rabbit cornea," Database Accession No. NLM7129102, Graefe's Archive for Clinical and Experimental Opthalmology, vol. 218, No. 6, pp. 287-293, Jun. 1982 (abstract only).
SynergEyes, Inc., "SynergEyes® A Practitioner Training," Mar. 2011, retrieved from the Internet at <http://www.fitsynergeyes.com/syn_a/synergeyesA_presentation.pdf>.
SynergEyes, Inc., "SynergEyes® A," package insert, P/N 70008 Rev. I, Oct. 2008.
SynergEyes®, Inc., Product Overview of CLEARKONE® and SYNERGEYES® PS, retrieved from the Internet at http://www.synergeyes.com/index.html on May 29, 2012.
European Patent Application No. 10825787.4, Examination Report dated Aug. 12, 2014.
European Patent Application No. 10825787.4, Search Report dated Jun. 18, 2013.
European Patent Application No. 98936282.7, Examination Report dated Mar. 26, 2004.
International Application No. PCT/US2009/002166, International Preliminary Report on Patentability dated Oct. 5, 2010.
International Application No. PCT/US2009/002166, International Search Report and Written Opinion dated Nov. 19, 2009.
International Application No. PCT/US2010/053854, International Preliminary Report on Patentability dated Apr. 24, 2012.
International Application No. PCT/US2010/053854, International Search Report and Written Opinion dated Mar. 1, 2011.
International Application No. PCT/US2010/053975, International Preliminary Report on Patentability dated Apr. 24, 2012.
International Application No. PCT/US2010/053975, International Search Report and Written Opinion dated Feb. 11, 2011.
International Application No. PCT/US2011/057755, International Search Report dated Feb. 7, 2012.
International Application No. PCT/US2012/035050, International Search Report and Written Opinion dated Oct. 3, 2012.
International Application No. PCT/US2013/037219, International Search Report and Written Opinion dated Sep. 30, 2013.
International Application No. PCT/US2013/059244, International Search Report and Written Opinion dated Nov. 26, 2013.
International Application No. PCT/US2014/044136, International Search Report and Written Opinion dated Jan. 16, 2015.
International Application No. PCT/US2014/064391, International Search Report and Written Opinion dated Jan. 26, 2015.
International Application No. PCT/US2014/065543, International Search Report and Written Opinion dated Feb. 25, 2015.
International Application No. PCT/US2015/013006, International Search Report and Written Opinion dated Apr. 2, 2015.
Japanese Patent Application No. 2011-502997, Office Action dated Jun. 14, 2013.
Japanese Patent Application No. 2011-502997, Office Action dated Mar. 3, 2014.
U.S. Appl. No. 12/384,659, Non-Final Office Action dated Jan. 21, 2016.
U.S. Appl. No. 13/456,168, Non-Final Office Action dated Sep. 12, 2013.
U.S. Appl. No. 13/456,168, Notice of Allowance dated May 30, 2014.
U.S. Appl. No. 13/503,841, Final Office Action dated Nov. 26, 2014.
U.S. Appl. No. 13/503,841, Non-Final Office Action dated Jun. 27, 2014.
U.S. Appl. No. 13/503,841, Non-Final Office Action dated Nov. 16, 2015.
U.S. Appl. No. 13/503,841, Final Office Action dated Jun. 9, 2016.
U.S. Appl. No. 13/503,842, Final Office Action dated Aug. 13, 2014.
U.S. Appl. No. 13/503,842, Non-Final Office Action dated Apr. 3, 2014.
U.S. Appl. No. 13/503,842, Non-Final Office Action dated Nov. 25, 2015.
U.S. Appl. No. 13/503,842, Notice of Allowance dated Jul. 11, 2016.
U.S. Appl. No. 13/555,056, Final Office Action dated Sep. 5, 2014.
U.S. Appl. No. 13/555,056, Non-Final Office Action dated Mar. 28, 2014.
U.S. Appl. No. 13/615,111, Notice of Allowance dated Apr. 23, 2013.
U.S. Appl. No. 13/715,917, Notice of Allowance dated Aug. 1, 2013.
U.S. Appl. No. 13/865,780, Notice of Allowance dated Mar. 28, 2016.
U.S. Appl. No. 13/885,135, Non-Final Office Action dated Nov. 18, 2014.
U.S. Appl. No. 13/885,135, Notice of Allowance dated Mar. 16, 2016.
U.S. Appl. No. 13/894,176, Non-Final Office Action dated Aug. 5, 2013.
U.S. Appl. No. 13/894,176, Notice of Allowance dated Feb. 26, 2014.
U.S. Appl. No. 13/928,077, Notice of Allowance dated Jan. 15, 2014.
U.S. Appl. No. 14/061,311, Non-Final Office Action dated Apr. 21, 2016.
U.S. Appl. No. 14/286,605, Non-Final Office Action dated Dec. 18, 2014.
U.S. Appl. No. 14/468,075, Final Office Action dated Apr. 1, 2016.
U.S. Appl. No. 14/532,707, Non-Final Office Action dated Feb. 25, 2016.
U.S. Appl. No. 14/532,707, Notice of Allowance dated Jun. 8, 2016.
U.S. Appl. No. 14/532,732, Non-Final Office Action dated Apr. 11, 2016.
U.S. Appl. No. 14/532,732, Final Office Action dated Oct. 3, 2016.
U.S. Appl. No. 14/539,698, Notice of Allowance dated Jan. 21, 2016.
U.S. Appl. No. 14/793,965, Non-Final Office Action dated Dec. 31, 2015.

CONTACT LENSES HAVING A REINFORCING SCAFFOLD

This application is a Continuation of U.S. application Ser. No. 14/539,698, filed on Nov. 12, 2014, which claims benefit under 35 U.S.C. §119(e) of U.S. Provisional Application No. 61/904,992, filed on Nov. 15, 2013, which is incorporated by reference in its entirety.

FIELD

This disclosure relates to ophthalmic lenses for correcting refractive error of an eye. Ophthalmic lenses include an inner optic portion having a scaffold between an anterior portion and a posterior portion. The scaffold is characterized by a substantially uniform thickness formed from a material characterized by a modulus that is higher than the modulus of the peripheral portion. Openings within the scaffold are filled with a low modulus material. When applied to an eye, the lenses are configured to provide one or more lenticular volumes between the posterior surface of the lens and the cornea. The disclosure further relates to methods of correcting refractive errors of an eye such as astigmatism or spherical aberration using the ophthalmic lenses.

BACKGROUND

Hybrid or bimodular contact lenses, lenses having a comparatively rigid central portion and a soft skirt or peripheral portion are used to correct refractive error of the eye such as astigmatism. Current products such as rigid gas permeable (RGP) and soft toric lenses for correcting refractive error include a cylindrical component in addition to any spherical corrective component that must be determined for each patient and oriented with respect to the optical region of the cornea to maintain optimal vision correction. Features are incorporated into the lens to maintain centration and radial orientation of the lens of the eye during wear. Because of the need to fit and orient the cylindrical corrective component, a large number of lenses must be maintained in inventory and individually fit and selected for each patient.

In light of the above, it is desirable to provide improved contact lenses for vision correction. Ideally, these contact lenses would provide treatments that improve tear flow and avoid at least some of the deficiencies of known techniques while providing improved patient comfort and/or vision. It is also desirable to provide improved contact lenses for correcting refractive error that only require a spherical fit and provide comfort and vision correction as good as or better than current toric lens products.

BRIEF SUMMARY

In a first aspect, ophthalmic lenses for correcting a refractive error of an eye are provided, the ophthalmic lenses comprising an inner optic portion configured to be disposed over an optical region of the cornea and comprising a center portion configured so that a posterior surface of the inner optic portion is characterized by a shape diverging from a refractive shape of the cornea, wherein the center portion comprises a scaffold; and a peripheral portion disposed radially outward of the inner optic portion.

In a second aspect, methods for correcting a refractive error of an eye are provided, the eye having a cornea with a refractive shape extending across an optical region of the cornea, the method comprising positioning an ophthalmic lens on the cornea so that an inner optic portion of the ophthalmic lens is disposed over the optical region of the cornea, wherein the ophthalmic lens comprises: an inner optic portion configured to be disposed over the optical region of the cornea and comprising a center portion configured so that a posterior surface of the inner optic portion has a shape diverging from the refractive shape of the cornea, wherein the center portion comprises a scaffold; and a peripheral portion disposed radially outward of the inner optic portion.

Figure 1A:
FIGS. 1A-1D show top, side, perspective and cross-section views of an ophthalmic lens according to certain embodiments.
Figure 1B:
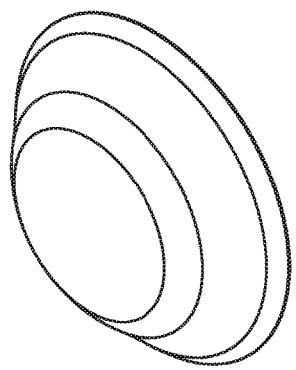
Figure 1C:
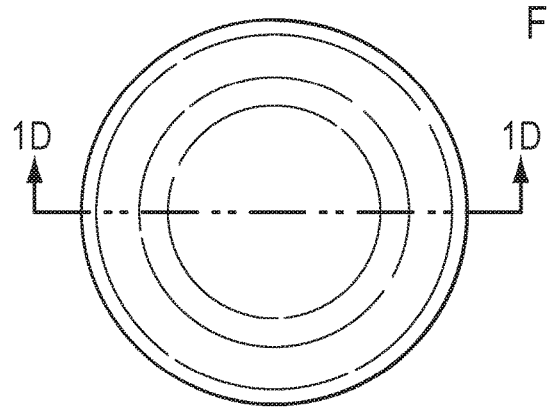

Reference is now made in detail to embodiments provided by the present disclosure. The disclosed embodiments are not intended to be limiting of the claims.

DETAILED DESCRIPTION

As used herein, mathematical equations and scientific notation can be used to identify values in many ways understood by a person of ordinary skill in the art. As used herein the symbol "E" can be used to express an exponent in base 10, such that 1E1 equals 10, 2E1 equals 20, and 4E2 equals 400. Units can be expressed in many ways and as would be understood by a person of ordinary skill in the art, for example "m" as meters, "Pa" as the Pascal unit for pressure, "MPa" as Mega Pascal.

As used herein, an on K fit of a device such as a contact lens encompasses fitting the contact lens to the flattest meridian of the cornea and the on K fit can be flatter than the flattest meridian within about 1.5 D. For example, for a cornea having keratometer values (K values) of about 44 D axis 90 and 43 D axis 180, the on K fit would provide a device having a curvature corresponding to an optical power within a range from about 43 D to about 41.5 D for the region of the eye measured. The on K fit as described herein can allow for tear liquid to form under the device such that the tear liquid can be pumped in accordance with embodiments as described herein.

The optical power of the cornea in Diopters (D) can be related to the radius R of curvature of the cornea with the formula $D=(1.3375-1)/R$, where 1.3375 corresponds to the index of refraction of the tear fluid. The curvature of the cornea is inversely related to the radius of curvature R such that as the radius of curvature increases the curvature of the cornea decreases and such that as the radius of curvature decreases, the curvature of the cornea increases.

Dk refers to oxygen permeability, i.e., the amount of oxygen passing through a device such as a contact lens over a given period of time and pressure difference conditions. Dk is express in units of $10^{-11}$ (cm/sec)(mL $O_2$)(mL×mm Hg), also known as a barrer. Oxygen transmissibility can be expressed as Dk/t, where t is the thickness of the structure such as a contact lens and therefore Dk/t represents the amount of oxygen passing through a contact lens of a specified thickness over a given set of time and pressure difference conditions. Oxygen transmissibility has the units of barrers/cm or $10^{-9}$ (cm/sec)(mL $O_2$)(mL×mm Hg).

The terms outer portion of a lens and peripheral portion of a lens are used interchangeably. The outer or peripheral portion is disposed radially around and connected to the inner portion of a covering or contact lens. In general, the outer or peripheral portion tapers from a thickness at the interface with the inner portion toward the outer or peripheral edge of the covering or contact lens. The outer or peripheral portion may be further characterized by sub-portions characterized by, for example, different radii of curvature, thickness, rigidity, and material. The sub-portions may be configured radially around the center optic portion. Furthermore, the outer or peripheral portion is typically disposed outside the optical region of the cornea with the covering or contact lens centered on the cornea of an eye. The inner portion includes a central inner optic portion through which the eye sees. The inner portion may have a diameter that is larger than the diameter of the inner optic portion The inner portion is also referred to herein as the inner or optical component or button. The outer portion is also referred to herein as the outer or coupling component.

The posterior surface of a contact lens or portion refers to a surface that is near to or faces the cornea during wear by a patient. The anterior surface of a contact lens or portion refers to a surface that is away from or faces away from the cornea during wear by a patient.

Bimodulus contact lenses having an inner optic portion with a material having a higher modulus than the material forming the outer peripheral portion can provide refractive correction independent of the spherical orientation on the cornea. The modulus of a material forming the inner optic portion provides a sufficiently rigid structure to provide a spherical posterior lens surface. Any non-spherical portions of the cornea are effectively spanned by the posterior lens surface to define lenticular volumes between the posterior lens surface and the cornea. When filled with tear fluid, the lenticular volumes form a tear lens. Because a bimodulus lens is spherically symmetric, astigmatic error can be corrected regardless of the spherical orientation on the cornea, eliminating the need for alignment or orientation features.

To provide sufficient rigidity of the inner optic portion, the material forming the inner optic portion can be relatively thin and be characterized by a high modulus, or can be relatively thick and be characterized by a lower modulus. Lower modulus materials and thin contact lenses generally enhance comfort of contact lens wear. To enhance comfort, a high modulus material may be covered with layers of low modulus material. This approach has the advantage that the high modulus material can be retained by and disposed within a low modulus material.

Eye health is promoted by oxygen permeability. For contact lenses, it is generally desirable that the oxygen permeability be greater than about 80 Dk. This high oxygen permeability can be difficult to obtain for high modulus materials and/or for thicker material cross-sections.

To provide spherically symmetric contact lenses capable of correcting astigmatic error, contact lenses are disclosed in which the inner optic portion includes a center portion having a scaffold formed from a high modulus material and characterized by a substantially uniform thickness.

The scaffold of the center portion imparts sufficient rigidity to the center optic portion to provide a spherical anterior lens surface and a spherical posterior lens surface for correcting refractive error.

Figure 1D:
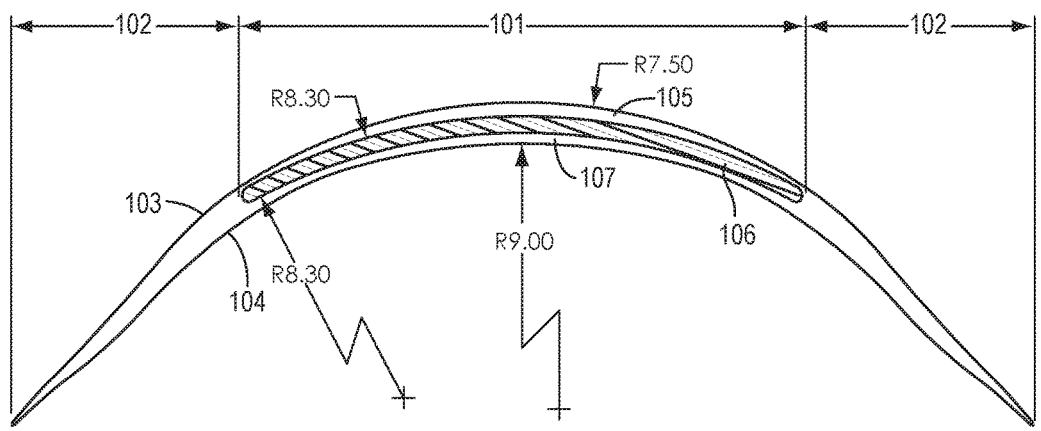
Figure 2A:
FIGS. 2A-2D show top, side, perspective and cross-section views of a scaffold according to certain embodiments.
Figure 2B:
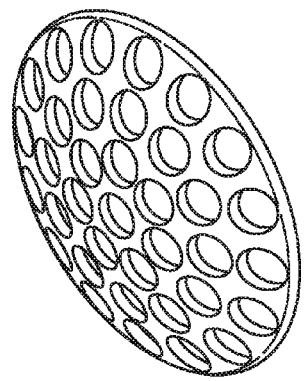
Figure 2C:
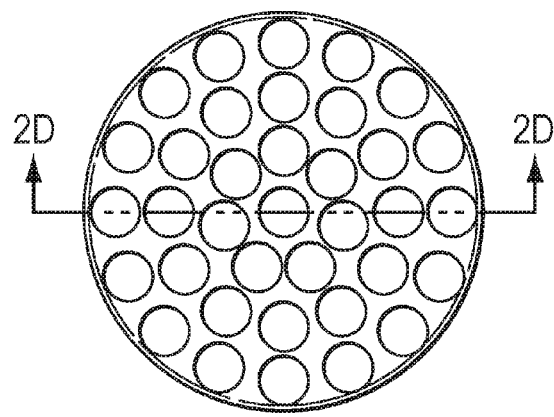
Figure 2D:
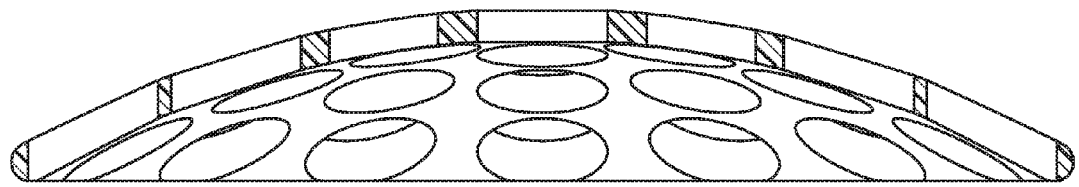
Figure 3A:
FIGS. 3A-3D show top, side, perspective and cross-section views of a scaffold according to certain embodiments.
Figure 3B:
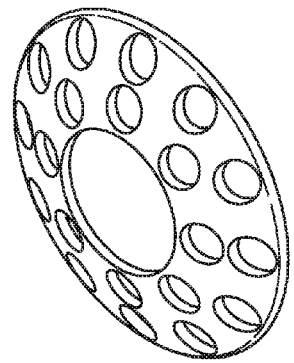
Figure 3C:
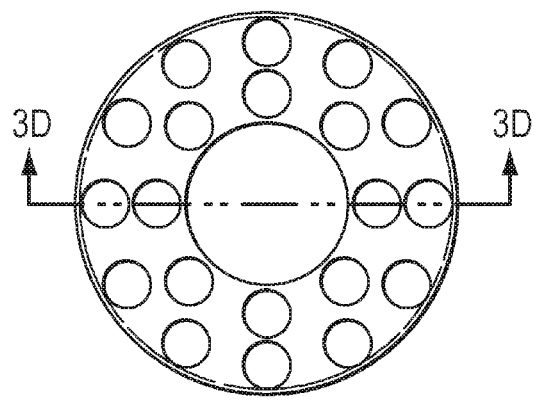
Figure 3D:
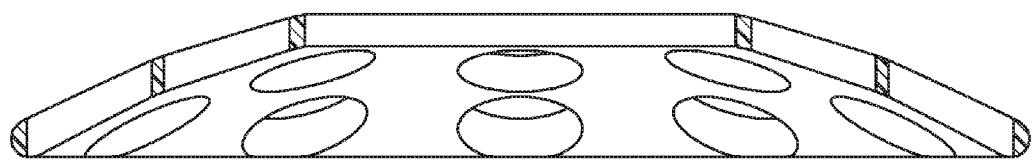
Figure 4A:
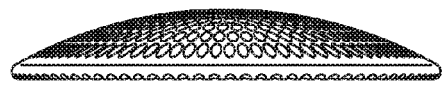
FIGS. 4A-4D show top, side, perspective and cross-section views of a scaffold according to certain embodiments.
Figure 4B:
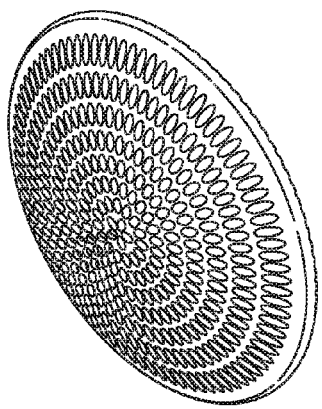
Figure 4C:
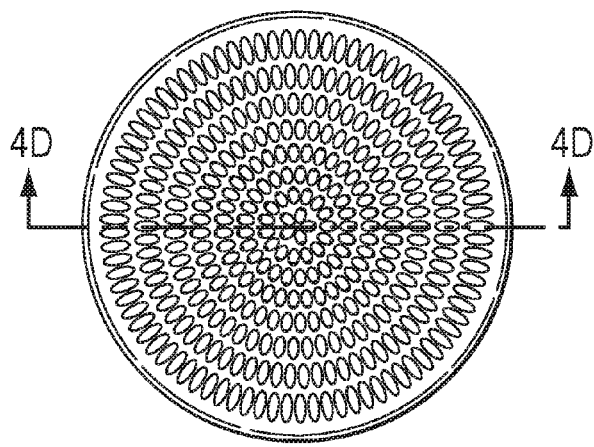
Figure 4D:
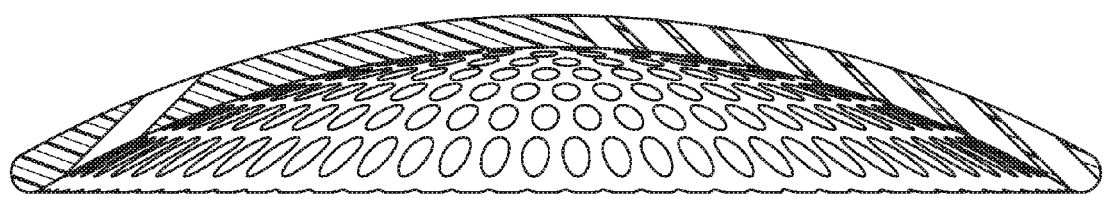
Figure 5A:
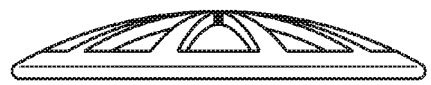
FIGS. 5A-5D show top, side, perspective and cross-section views of a scaffold according to certain embodiments.
Figure 5B:
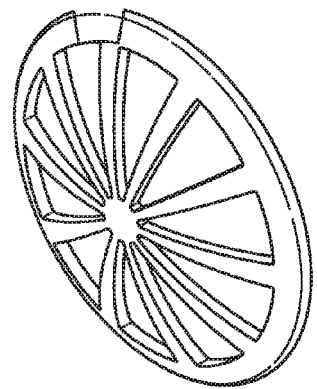
Figure 5C:
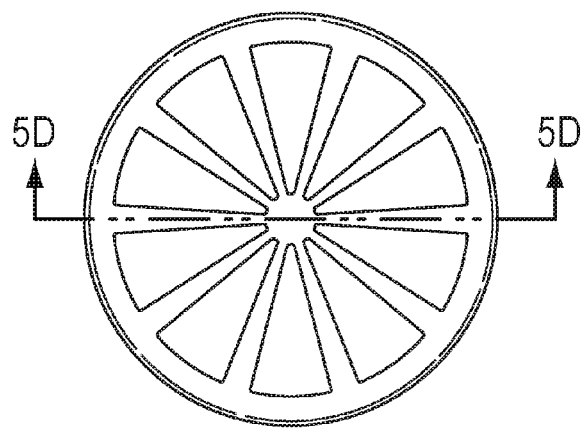
Figure 5D:
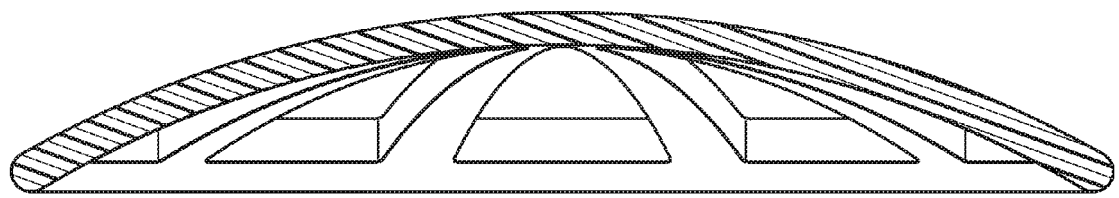
Figure 6A:
FIGS. 6A-6D show top, side, perspective and cross-section views of a scaffold according to certain embodiments.
Figure 6B:
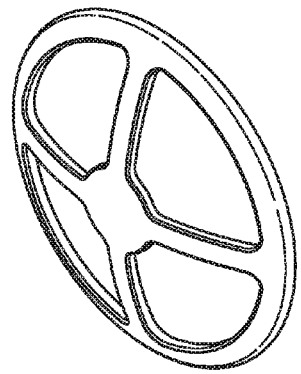
Figure 6C:
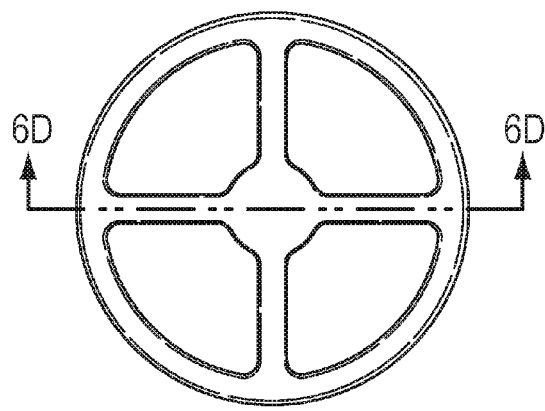
Figure 6D:
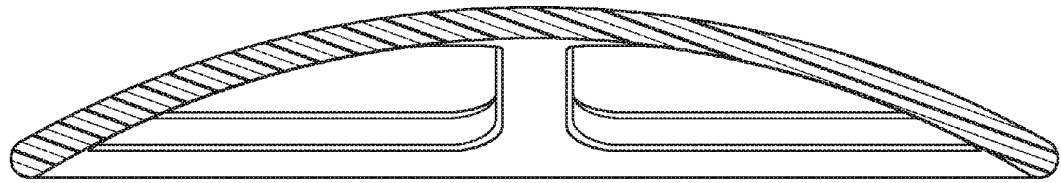

FIGS. 1A-1D show various views of a contact lens having a scaffold. FIG. 1D shows a cross-section of a contact lens having an inner optic portion 101, peripheral portion 102, anterior surface 103, and posterior surface 104. Inner optic portion 101 includes anterior portion 105, center portion 106, and posterior portion 107. Center portion 106 is characterized by a substantially uniform thickness and is embedded between anterior portion 105 and posterior portion 107. As suggested by FIG. 1D, anterior portion 105, posterior portion 107, and peripheral portion 102 may be formed from the same material, and center portion 106 may be formed from a different material. In certain embodiments, center portion 106 also includes openings, which are not shown in FIG. 1D. The anterior surface 103 and the posterior surface 104 of the inner optic portion are characterized by a spherically symmetric profile. A center portion may have the same diameter as the inner portion, may have a diameter greater than that of the inner portion, or may have a diameter smaller than that of the inner portion. The inner portion may have a diameter that is larger than the inner optic portion through which the eye sees.

In certain embodiments, the center portion is a solid material and is characterized by a substantially uniform thickness. In certain embodiments, the solid material is homogenous.

In certain embodiments, the center portion may be configured with openings, holes, channels or other features such that the center portion serves as a scaffold or structural support rather than as a continuous section or button of homogeneous material.

The openings can serve several functions including, for example, increasing oxygen permeability, increasing tear flow, and enabling the use of a high modulus material in the inner portion while maintaining a relatively thin cross-sectional profile. Furthermore, the openings can be filled with another optical material such as a low modulus material that can serve to retain and thereby increase the mechanical integrity of the bimodulus contact lens.

The openings in the center portion may be any suitable configuration. Examples of suitable configurations are shown in FIGS. 2A-6D. In general, the configuration of the openings is selected to provide a suitable rigidity to the center optic portion, to enhance vision, and to promote eye health.

FIGS. 2A-2D show a scaffold configuration in which round openings having similar diameters are disposed throughout the center portion. The round openings may be disposed in any suitable configuration and may form a regular or irregular pattern. Each of the round openings may have similar diameters, may have different diameters, or may have a combination of diameters. Round openings having different diameters may be disposed in certain regions of the center portion. For example, the round openings toward the central axis may have a larger diameter than those located toward the outer edge of the center portion. In certain embodiments, the openings are disposed to minimize any optical distortion to normal vision and to optimize visual acuity. The cross-sectional profile of any opening may have any suitable shape such as oval and are not necessarily round.

In certain embodiments, the round openings may have a diameter ranging from 10 µm to 1000 µm including, for example, 50 µm to 500 µm, 100 µm to 500 µm, or 50 µm to 250 µm. In certain embodiments, the openings may have at least one dimension ranging from 10 µm to 1000 µm including, for example, 50 µm to 500 µm, 100 µm to 500 µm, or 50 µm to 250 µm.

FIGS. 3A-3D show a scaffold configuration in which the center portion includes a large-diameter opening located in the center with smaller openings disposed toward the outer edge of the scaffold. In such embodiments, the center opening may have a diameter from 1 mm to 4 mm or other suitable diameter.

FIGS. 4A-4D show a scaffold having a plurality of smaller openings located along circles centered around the center axis of the scaffold. Notably, FIG. 4C also shows that the openings are angled with respect to the cross-sectional thickness of the scaffold. Thus, in certain embodiments, the openings may be substantially perpendicular to the cross-sectional thickness of the scaffold, and in certain embodiments, may be angled with respect to the cross-sectional thickness of the scaffold.

FIGS. 5A-5D show a scaffold configuration in which the center portion has wedge-shaped openings forming a hub-and-spoke arrangement. As shown in FIGS. 5A-5D, the center portion includes ten wedge-shaped openings. However, any suitable number of wedge-shaped openings may be employed. For example, FIGS. 6A-6D show a configuration in which the center portion includes four wedge-shaped openings.

It can be appreciated that other configurations of openings are possible. In certain embodiments it may be desirable that openings be relatively large to facilitate manufacture and/or to minimize the interface area between the scaffold and the material in which the scaffold is embedded.

In certain embodiments, openings can be in the form of concentric rings held together by ribs. In other embodiments, a scaffold may include a central opening with structural support provided concentric to the optic axis of the scaffold. In such configurations, the scaffold can take the form of a concentric ring or modified concentric ring disposed outside the inner optic portion of the lens. In general, the number, dimensions, and configuration of the openings in the scaffold can be selected to provide a desired rigidity and minimize interference with normal vision and optimize visual acuity. Manufacturing and reliability can also be important to the selection of appropriate scaffold designs.

The number, size, and/or shape of the openings may be selected to provide sufficient rigidity and oxygen permeability to the inner optic portion of the ophthalmic lens. The number, size, and/or shape of the openings may also be selected to facilitate manufacturing. For example, depending on whether the center portion is fabricated using injection molding, compression molding, cast molding, or other suitable molding technology, the design may be selected to facilitate the manufacturability and quality of the part.

The openings in the center portion may be distinguished from openings used to enhance tear flow and oxygen permeability. Such openings that extend through the thickness of a contact lens are generally characterized by a diameter less than 100 µm. In contrast, the openings used to provide high modulus scaffolds of the present disclosure are larger such that, in certain embodiments, the scaffold itself is only a small portion of the inner optic portion.

The center scaffold is primarily configured to provide mechanical structure. In certain embodiments, the center scaffold is not configured to provide an optical function.

In certain embodiments, the center scaffold section is characterized by a substantially uniform thickness. A substantially uniform thickness refers to a thickness that varies less than +/−2% across the profile, +/−5% across the profile, and in certain embodiments less than +/−10% across the profile, where percent is based on the nominal thickness of the scaffold. In certain embodiments, the center scaffold portion may be characterized by a non-uniform thickness; however, the effect of the non-uniform thickness is not to affect the optical properties of the inner optic portion. For example, the center scaffold portion may be thicker toward the edge or may be thicker toward the center. However, the optical properties of contact lenses provided by the present disclosure are determined by the spherically-shaped anterior and posterior lens surfaces.

In certain embodiments, the anterior portion is characterized by a thickness from about 25 µm to about 250 µm, the posterior portion is characterized by a thickness from about 25 µm to about 250 µm, and in certain embodiments, both the anterior portion and the posterior portion are characterized by a thickness from about 25 µm to about 250 µm.

In certain embodiments, the scaffold can be characterized by a thickness from about 50 µm to about 300 µm, from about 75 µm to about 300 µm, from about 100 µm to about 275 µm, from about 125 µm to about 250 µm, and in certain embodiments, from about 125 µm to about 225 µm.

In certain embodiments, a scaffold is characterized by a curvature configured to fit within a smooth cross-section profile of the contact lens. The scaffold may have a diameter smaller than the optical region of the cornea, larger than the optical region of the cornea, or about the same diameter as the optical region of the cornea.

In general, the thickness, diameter, curvature, and design of the scaffold are configured to maintain a spherically symmetric posterior surface of the lens. The lens may deform upon blinking but may sufficiently recover so as not to significantly affect vision of the eye.

In certain embodiments, the maximum thickness of the inner optic portion is from about 100 µm to about 500 µm, in certain embodiments, from about 150 µm to about 350 µm, from about 200 µm to about 300 µm, and in certain embodiments, from about 225 µm to about 275 µm.

In certain embodiments, the anterior portion, the posterior portion and/or the filler material is characterized by an oxygen permeability from about 10 Dk to about 500 Dk, from about 50 Dk to about 400 Dk, from about 50 Dk to about 300 DK, and in certain embodiments from about 50 DK to about 100 Dk.

In certain embodiments, the material forming the scaffold is characterized by an oxygen permeability from about 0 Dk to about 300 Dk, from about 0 Dk to about 100 DK, and in certain embodiments, from about 0 Dk to about 50 Dk.

In certain embodiments, the high modulus scaffold represents from about 20 vol % to about 80 vol % of the center portion, from about 30 vol % to about 70 vol %, from about 30 vol % to about 60 vol %, and in certain embodiments, from about 30 vol % to about 50 vol % of the total volume of the center portion.

In certain embodiments, the modulus of the material forming the scaffold ranges from 300 MPa to 3000 MPa, from 500 MPa to 2000 MPa, from 800 MPa to 1800 MPa, and in certain embodiments from 1000 MPa to 1400 MPa.

In certain embodiments, a center portion is characterized by a rigidity from about $1E9$ MPa-µm$^3$ to $1E11$ MPa-µm$^3$, from $1E9$ to $5E10$ MPa-µm$^3$, from $1E9$ MPa-µm$^3$ to $2E10$, from $2E9$ to $2E10$ MPa-µm$^3$, from $4E9$ MPa-µm$^3$ to $2E10$ MPa-μm³, from 6E9 MPa-μm³ to 2E10 MPa-μm³, and in certain embodiments, from 8E9 MPa-μm³ to 2E10 MPa-μm³.

In certain embodiments, the contact lens is configured to have a maximum thickness less than about 400 μm and an inner optic portion characterized by a rigidity from about 1E9 MPa-μm³ to about 1E11 MPa-μm³.

In certain embodiments, the contact lens is configured to have a maximum thickness less than about 350 μm and an inner optic portion characterized by a rigidity from about 1E9 MPa-μm³ to about 5E10 MPa-μm³.

In certain embodiments, the contact lens is configured to have a maximum thickness less than about 300 μm and an inner optic portion characterized by a rigidity from about 1E9 MPa-μm³ to about 2E10 MPa-μm³.

The high modulus material is formed into a disc-like part or scaffold that can be embedded in a soft material. The part made from the high modulus material can be of substantially uniform thickness across its diameter, meaning it has no optical power by itself. The anterior and posterior surfaces of the inner optic portion can be made from the low modulus material and dictate the optics of the system. The scaffold may be a continuous structure with smooth surfaces or it may be modified with uniform through holes, non-uniform through holes, a spoke-like pattern, an open-cell foam, or other pattern that permits gas flow while maintaining structural integrity. The material may be removed such that the through holes are oriented normal to the surface of the scaffold or diagonally oriented at any angle. The open space created by removing material from the scaffold can be filled with a low modulus material. This will allow for the use of low oxygen permeable materials as the high modulus material. The lower the oxygen permeability of the rigid material, the more material can be removed in order to create a part with sufficient oxygen permeability. As more material is removed from the scaffold, its ability to reinforce the optical shape formed by the soft material can decrease. Therefore, a balance can be made in material modulus and oxygen permeability to design an oxygen permeable reinforcing structure made from the high modulus material. Oxygen transmissibility of an inner optic portion having a rigid scaffold and low modulus anterior, posterior and filling portions can be estimated using the Equation (1) and Equation (2):

$$\frac{Dk}{t} = 100 * \left( \frac{s_b}{\left(\frac{t_a}{Dk_a} + \frac{t_b}{Dk_b} + \frac{t_d}{Dk_d}\right)} + \frac{s_c}{\left(\frac{t_a}{Dk_a} + \frac{t_c}{Dk_c} + \frac{t_d}{Dk_d}\right)} \right) \quad (1)$$

$$\text{Rigidity} = t_t^3 (E_a * f_a + s_a * E_b * f_b + s_c * Ec * f_c + E_d * f_d) \quad (2)$$

$Dk_x$=Oxygen Permeability of material "x" (Fatt Units)
$t_x$=thickness of material "x" (microns) ($t_t$=total thickness of system)
$f_x = t_x/t_t$
$s_x$=fractional amount of material "x" that exists across thickness t, (for an un-modified disc: $s_x=1$)
$E_x$=Young's Modulus of Material "x."
The results of example calculations are shown in Table 1.

In general, low modulus materials are characterized by high oxygen permeability such as oxygen permeability from about 10 Dk to about 500 Dk, and in certain embodiments from about 100 Dk to 400 Dk.

In general, high modulus materials are characterized by low oxygen permeability such as less than 300 Dk, less than 200 Dk, less than 100 Dk, less than 50 Dk, and in certain embodiments, less than 10 Dk.

In general, for a continuous wear contact lens it is desirable that the oxygen transmissibility be at least 50 Dk/t, at least 80 Dk/t, at least 90 Dk/t, and in certain embodiments, at least 100 Dk/t.

To reduce optical artifacts it is desirable that the refractive index of the material forming the scaffold be closely matched to the refractive index of the material filling the openings and forming the anterior portion and the posterior portion of the inner optic portion. For example, in certain embodiments, the difference in the refractive index is less than 0.03, less than 0.025, less than 0.02, less than 0.015, less than 0.010 and in certain embodiments, less than 0.005.

The material forming the scaffold and the material forming the anterior portion, posterior portion, and the filler portion should have similar indices of refraction in order to minimize internal reflections within the part. For example, a Boston EO RGP has a refractive index of 1.429 (Modulus=1600 MPa) can be used with a soft material, for example lotrafilcon A that has a refractive index of 1.43. If using the Boston Equalens II (refractive index=1.423) a soft material such as hefilcon B (refractive index 1.42) can be used.

The materials forming the scaffold and the materials filling the openings in the scaffold, the anterior portion, and the posterior portion of the inner optic portion of the contact lens can be selected to have similar chemistries such that covalent bonds form between the dissimilar materials. For example, the low modulus material and the high modulus material forming the scaffold may be silicon-based or may contain silicon. Thus, in certain embodiments, the scaffold may be formed from a blend of silicon and other material.

Alternatively, to ensure adhesion between the scaffold and the surround material the surface of the scaffold may be treated to enhance adhesion such as plasma treatment or other suitable treatment method.

Contact lenses formed from dissimilar hydrous material can be difficult to manufacture because of differential swelling of the materials during hydration. Therefore, it is desirable to select the low modulus and high modulus materials to exhibit similar swelling when hydrated. Alternatively, to avoid or at least minimize problems associated with differential swelling, the low modulus materials and the high modulus materials can be selected to be non-hydrous such that the materials exhibit minimal swelling when hydrated.

Eye health is promoted by the presence and flow of tear fluid along the surface of the cornea. Because the contact lenses provided by the present disclosure are spherically symmetric and are configured to correct astigmatic error independent of the orientation on the cornea, the lenses can freely move and thereby promote the flow and exchange of tear fluid across the surface of the cornea. The scaffold can further help to center the contact lens on the cornea following blinking. Alternatively, or in addition to, fenestrations may be provided through the contact lens proximate to the inner optic region and/or in the peripheral region to further promote the flow and exchange of tear fluid. The fenestrations may further serve to maintain a reservoir of tear fluid within the lenticular volume and thereby support the spherical profile of the posterior surface of the contact lens.

The base curve and the spherical power of the lens can be independent of the shape of the scaffold.

The material forming the center scaffold portion is characterized by a refractive index similar to that of the other materials forming the inner optic portion of the contact lens. In certain embodiments, the material forming the center scaffold portion is characterized by a refractive index that is similar to that of the cornea such as, for example, from about 1.4 to about 1.5, from about 1.42 to about 1.48, and in certain embodiments, from about 1.43 to about 1.47.

The openings in the center scaffold portion are filled with an interstitial material. The interstitial material will generally be characterized by a lower modulus and a higher oxygen permeability than the modulus and oxygen permeability of the center scaffold material. In addition, the material filling the openings in the scaffold will have a refractive index that is substantially similar to the material forming the scaffold. For example, in certain embodiments the material filling the openings in the scaffold will be characterized by a refractive index from about 1.4 to about 1.6.

In addition to the center scaffold portion, the inner optic portion includes at least one layer of material anterior to the center scaffold portion, and at least one layer of material posterior to the center scaffold portion. The materials located anterior and posterior to the center scaffold portion may be the same or may be different materials. For ease of fabrication, in certain embodiments, the materials located anterior and posterior to the center scaffold portion can be the same materials.

In certain embodiments, the material filling the openings in the scaffold will be the same as the material forming the anterior and/or posterior materials of the inner optic portion.

In certain embodiments, the material forming the anterior and/or posterior materials of the inner optic portion will extend to the peripheral portion and in certain embodiments will be the same material as the peripheral portion.

Material forming the anterior and/or posterior portions of the inner optic portion may be characterized by a modulus from 0.1 MPA to 10 MPa, from 0.1 MPa to 5 MPa, or in certain embodiments from 0.1 to 2 MPa. In certain embodiments, the filler material in the scaffold openings may be characterized by a modulus from 0.1 MPA to 10 MPa, from 0.1 MPa to 5 MPa, or in certain embodiments from 0.1 to 2 MPa.

In certain embodiments, the material forming the anterior and/or posterior portions of the inner optic portion may be formed from a material characterized by a high oxygen permeability (Dk, cm·mL $O_2$/sec·mL·mm Hg) such as from $100 \times 10^{-11}$ to $500 \times 10^{-11}$, from $200 \times 10^{-11}$ to $500 \times 10^{-11}$, from $250 \times 10^{-11}$ to $450 \times 10^{-11}$, from $300 \times 10^{-11}$ to $400 \times 10^{-11}$, and in certain embodiments, about 350.

In certain embodiments, devices provided by the present disclosure are characterized by a high oxygen transmissibility (Dk/t) such as at least about $50 \times 10^{-9}$, at least about $80 \times 10^{-9}$, at least about $100 \times 10^{-9}$, and in certain embodiments, at least about $120 \times 10^{-9}$.

The material forming the anterior portion, posterior portion, and/or filler portion of the inner optic portion may be hydrous or in certain embodiments may be anhydrous. An anhydrous material refers to a material having a water content, when fully hydrated, less than 10 wt %, less than 5 wt %, and in certain embodiments, less than 2 wt %. A hydrous material refers to a material having a water content, when fully hydrated, greater than 10 wt %.

In certain embodiments, a lens may comprise silicone or silicone hydrogel having a low ionoporosity. For example, a device may comprise silicone hydrogel or silicone comprising a low ion permeability, and the range of water can be from about 5% to about 35%, such that the Dk is $100 \times 10^{-11}$ or more. In certain embodiments, the low ion permeability may comprise an Ionoton Ion Permeability Coefficient of no more than about $0.25 \times 10^{-3}$ cm$^2$/sec, for example no more than about $0.08 \times 10^{-3}$ cm$^2$/sec.

An ophthalmic lens may comprise a wettable surface coating disposed on at least the upper side (anterior surface) of the device, such that the tear film of the patient is smooth over the device and the patient can see. The wettable surface coating may comprise a lubricious coating for patient comfort, for example to lubricate the eye when the patient blinks. The wettable coating may create a contact angle no more than about 80 degrees. For example the coating may create a contact angle no more than about 70 degrees, and the contact angle can be within a range from about 55 degrees to 65 degrees to provide a surface with a smooth tear layer for vision. For example, the wettable coating can be disposed both an upper surface and a lower surface of the device, i.e., on the anterior and posterior surface of the ophthalmic lens. The upper surface may comprise the wettable coating extending over at least the inner optic portion.

A wettable coating may comprise one or more suitable materials. For example, the wettable coating may comprise polyethylene glycol (PEG), and the PEG coating can be disposed on Parylene™. Alternatively, the wettable coating 134 may comprise a plasma coating, and the plasma coating may comprise a luminous chemical vapor deposition (LCVD) film. For example, the plasma coating may comprise at least one of a hydrocarbon, for example, $CH_4$, $O_2$ or fluorine containing hydrocarbon, for example, $CF_4$ coating. Alternatively or in combination, a wettable coating may comprise a polyethylene glycol (PEG) coating or 2-hydroxyethylmethacrylate (HEMA). For example, a wettable coating may comprise HEMA disposed on a Parylene™ coating, or a wettable coating may comprise N-vinylpyrrolidone (NVP) disposed on a Parylene™ coating.

In certain embodiments, ophthalmic lenses provided by the present disclosure are configured to correct refractive error such as astigmatism. The lenses provide a smooth spherical anterior surface and minimize lens-induced distortions by reducing flexure of the inner optical portion and by maintaining lens centration during wear. Reduced flexure of the inner optical portion can in part be accomplished by increasing the rigidity of the inner portion and by creating a tear lens. Centration of the inner optical portion minimizes astigmatic and prismatic effects caused by tilting of the optic and also minimizes edge distortion.

Ophthalmic lenses provided by the present disclosure can achieve visual correction at least equivalent to that of soft toric contact lenses and achieve a superior comfort level compared to soft toric contact lenses. Furthermore, because the ophthalmic lenses provided by the present disclosure are radially symmetric, fitting to an eye of the patient involves only accommodating the spherical correction and an inventory of lenses for correcting cylindrical error is not required.

Ophthalmic lenses provided by the present disclosure include an inner optic portion configured to be disposed over the optical region of the cornea and a peripheral or outer portion that is disposed radially outward of the inner portion. An ophthalmic lens includes a posterior surface that extends along the inner portion of the lens and is adjacent an eye when applied to an eye of a patient. An ophthalmic lens also includes an anterior surface that extends along the outer surface of the lens and opposite the posterior surface. In general, the inner portion of a lens is configured to improve vision and the peripheral portion is configured to improve comfort. However, the configuration of the inner portion can also play a role in determining patient comfort, and the peripheral portion, at least in part, by maintaining centration of the inner optical portion on the optical portion of the cornea during wear enhances the visual outcome.

The inner optical portion of a lens is configured so that engagement of the posterior surface against the eye deforms the posterior surface so that the posterior surface of the inner portion has a shape diverging from the refractive shape of the epithelium and optical portion of the cornea. The anterior surface of the inner portion of the ophthalmic lens provides a spherical surface to correct a patient's vision.

In certain embodiments, the inner optical portion of a lens is characterized by a diameter from about 5 mm to about 10 mm, from about 7 mm to about 9 mm, from about 7.5 mm to about 8.5 mm, from about 7.8 mm to about 8.2 mm, and in certain embodiments, about 8 mm. The anterior inner portion of a lens is characterized by a substantially spherical profile without a cylindrical component.

In certain embodiments, the material forming a device including both the inner and outer portions have low water content and is characterized by low water or ion permeability. In certain embodiments, the water content is less than about 5%, less than about 4%, and in certain embodiments, less than about 3%. In certain embodiments, the material forming a device has a water content less than about 1%, less than about 0.6%, and in certain embodiments, less than about 0.3%. In certain embodiments, the material less than about $0.4 \times 10^{-6}$ cm$^2$/sec, less than about $0.2 \times 10^{-6}$ cm$^2$/sec, and in certain embodiments, less than about $0.1 \times 10^{-6}$ cm$^2$/sec.

A peripheral portion is disposed radially outward of the inner portion of an ophthalmic lens. In general, the peripheral portion retains the inner portion and is characterized by approximately the same thickness as the inner portion at the interface between the inner and peripheral portions, and the thickness of the peripheral portion tapers toward the peripheral edge. In certain embodiments, the diameter of the peripheral edge is from about from about 12 mm to 16 mm, 13 mm to about 16 mm, from about 13.5 mm to about 15.5 mm, from about 14 mm to about 15 mm, and in certain embodiments, from about 14.2 mm to about 14.8 mm.

The peripheral portion is characterized by a lower rigidity than the inner portion and can be formed from a material having a lower modulus than that of the inner portion. In certain embodiments, the material forming the peripheral portion is characterized by a modulus from about 0.5 MPa to about 2.0 MPa, from about 0.8 MPa to about 1.7 MPa, from about 1.0 MPa to about 1.4 MPa, and in certain embodiments, about 1.2 MPa.

The peripheral portion is configured to provide tear flow between the anterior surface of the device and the epithelium. In certain embodiments, the peripheral portion comprises a plurality of fenestrations extending from the anterior to the posterior surface of the peripheral portion. In certain embodiments, the plurality of fenestrations are disposed at a radius from a central optical axis of the ophthalmic lens such as for example, at a radius proximate to the interface between the inner portion and the peripheral portion. The plurality of fenestrations may be symmetrically or asymmetrically disposed. The fenestrations may be configured to pump tear liquid between the peripheral portion and the epithelium when the eye blinks so as to maintain a tear layer between the posterior surface of the lens and the epithelium and/or across the anterior surface of the lens. In certain embodiments, the plurality of fenestrations may be configured to facilitate removal of the lens from the eye. In certain embodiments, the plurality of fenestrations may be configured to facilitate air dissipation if air bubbles are trapped underneath the lens, In certain embodiments, the plurality of fenestrations facilitates the removal of air bubble entrapped within any lenticular volumes following application of a lens to a patient's eye. The plurality of fenestrations may facilitate both removal of the lens form the eye and dissipation of air bubbles. In certain embodiments, the plurality of fenestrations improves the reproducibility of visual outcome in a population of patients wearing the lens compared to the visual outcome in a population of patients wearing a comparable lens without fenestrations.

In certain embodiments, the inner portion, the peripheral portion, or both the inner and peripheral portions of an ophthalmic lens provided by the present disclosure are radially symmetric. In certain embodiments, the anterior surface of the inner portion and the posterior surface of the inner portion are radially symmetric.

In certain embodiments of ophthalmic lenses provided by the present disclosure, the inner portion and the peripheral portion are configured to allow movement of the lens relative to the eye in response to blinking of the eye. In such embodiments, an ophthalmic lens is configured such that the inner optical portion centers on the optical portion of the cornea following blinking. During blinking the inner portion, the peripheral portion, or both the inner and peripheral portions may deform and/or move with respect to the center optical axis of the cornea. When an ophthalmic lens is worn by a patient, depending at least in part by the shape of the patient's eye and the configuration of the lens, the ophthalmic lens may move during blinking or may exhibit only micro-movement. However, in certain embodiments, a lens is not configured to resist movement such that, for example, the peripheral edge of the lens is not configured to fixedly engage the epithelium or sclera such that the inner portion resists movement relative the cornea.

In certain embodiments of ophthalmic lenses provided by the present disclosure, the inner portion and the peripheral portion are configured to provide a tear fluid flow between the peripheral portion of the ophthalmic lens and the epithelium.

The peripheral portion of a lens can be tapered toward the peripheral edge. The taper may be continuous or discontinuous. The peripheral portion may be flared outward toward the peripheral edge and is referred to as a modified heeled configuration. A cross-sectional profile of a lens is determined by the inner portion characterized by a substantially constant thickness and the shape of the taper of the peripheral portion. In general, the cross-sectional shape of an ophthalmic lens is configured to correct refractive error of any eye, center the lens on the optical portion of the cornea, facilitate motion of the lens with respect to the eye, provide flow of tear liquid between the posterior surface of the lens and epithelium, and to provide comfort to a patient wearing the lens. The ability of the lens to move, provide a fluid layer, and exchange tear fluid facilitates eye health and improves comfort for extended wear.

Ophthalmic lenses provided by the present disclosure include features intended to confer attributes of benefit to a person wearing the lens. For example, the semi-rigid inner optic portion provides a near spherical anterior surface and maintains the intended near spherical curvature during wear. By minimizing toricity and irregularities of the anterior surface of the lens and minimizing flexure, the lens provides good vision. Vision and health of the eye are enhanced by the presence of fenestrations. Furthermore, the semi-rigid inner optic portion is sufficiently flexible to accommodate a range of corneal curvatures and is able to mask corneal toricity by forming a lenticular tear volume between the posterior surface of the lens and the cornea. In certain embodiments, in part depending on the shape of a cornea, one or more lenticular volumes are formed between the posterior surface of the lens and the cornea.

The fenestrations provide a supply of fluid between the posterior surface of the lens and the epithelium of the eye to maintain a tear layer, which supports the intended curvature of the lens to provide good vision. Fenestrations also maintain eye health by allowing for rapid tear exchange to circulate metabolic waste and to transmit oxygen to the tear layer. Fenestrations also prevent a lens from creating vacuum seal to the eye, allowing the lens to move on the eye and facilitating lens removal.

The materials forming the outer portions of the inner optic portion and the outer peripheral portion can have a low Young's modulus that improves patient comfort. Also, a thickness of a material along the posterior surface of the inner optic portion having a Young's modulus less than the modulus of the material forming the inner optic portion may provide additional comfort. In addition to the effect of the fenestrations, eye health is further enhanced by the use of silicones and/or silicone hydrogels to form the lens. Silicones and/or silicone hydrogels are physiologically compatible and can provide high oxygen permeability and ion permeability.

In certain embodiments, ophthalmic lenses provided by the present disclosure include a plurality of fenestrations. The fenestrations can provide a supply of tear fluid to establish and maintain a tear volume between the posterior surface of the inner optic portion and the cornea to support the intended lens curvature, allow exchange of tear fluid to circulate metabolic waste, and to supply and maintain a high oxygen content at the surface of the cornea.

Fenestrations can be disposed within the inner optic portion of the ophthalmic lens, within the peripheral portion of the ophthalmic lens, or within both the inner optic and peripheral portions of the ophthalmic lens. In certain embodiments, the fenestrations may be disposed along one or more rings situated at a radius from the central axis of the ophthalmic lens. Each ring may include from one (1) to twenty (20) fenestrations. In certain embodiments, fenestrations may be disposed along one or more rings disposed at different radii from the central axis of the ophthalmic lens.

For example, in certain embodiments the plurality of fenestrations can be disposed at a combination of a first radius, a second radius, a third radius, and a fourth radius from a central optical axis of the ophthalmic lens, wherein: the first radius is disposed within the inner optic portion and from 0.5 mm to 1.0 mm from an interface between the inner optic portion and the peripheral portion; the second radius is disposed within the peripheral portion and from 0.5 mm to 1.5 mm from the interface between the inner optic portion and the peripheral portion; the third radius is disposed within the peripheral portion and from 1.5 mm to 2.5 mm from the interface between the inner optic portion and the peripheral portion; and the fourth radius is disposed within the peripheral portion and from 0.5 mm to 2.5 mm from an edge of the peripheral portion.

In certain embodiments, an ophthalmic lens may comprise anywhere from 1 to 20 fenestrations. The location and cross-section of certain fenestrations may be configured to pump tear liquid between the posterior surface of the lens and the epithelium when the eye blinks. Circulation of tear fluid can help to maintain eye health. Certain fenestrations may be configured to maintain a tear layer between the eye and one or more portions of the posterior surface of the inner optic portion. The tear layer can help to maintain health of the eye, can help to provide comfort, and can facilitate removal of the lens from the eye. Certain portions of an ophthalmic lens may conform to the cornea while other portions may create one or more lenticular volumes between the posterior surface of a lens and the cornea. Certain fenestrations can be configured to maintain tear fluid within the lenticular volumes. The lenticular volumes in conjunction with the ophthalmic lens form a tear lens for improving vision. Fenestrations located proximate to the interface between the inner optic portion and the peripheral portion may serve to maintain tear fluid within lenticular volumes. Certain fenestrations such as those located within the peripheral portion may be configured to maintain eye health and to facilitate removal of the lens from the eye.

In certain embodiments, a plurality of fenestrations is disposed within the inner optic portion to provide for sufficient tear flow beneath the inner optic portion to establish and maintain a lenticular tear volume between the posterior surface of the inner optic portion and the cornea. The tear volume maintains the spherical shape of the lens on the eye to improve patient vision. While certain portions of the posterior surface of the lens can conform to the surface of the cornea, where the cornea is characterized by toric and/or cylindrical irregularities, the inner optic portion is sufficiently rigid that it bridges the corneal irregularities creating one or more lenticular volumes which are filled with tear fluid.

The number and location of the fenestrations can be configured to achieve one or more of these benefits.

In certain embodiments, the tear volume beneath certain portions of the inner optic portion of the ophthalmic lens can be maintained by fenestrations located just outside the diameter of the inner optic portion of the lens.

Fenestrations located within the peripheral portion of the lens can maintain eye health, provide tear film that facilitates motion of the lens on the cornea, and/or facilitate removal of the lens from the eye.

Fenestrations may be any suitable shape, be situated and any suitable orientation with respect to the cross-sectional profile of the lens. In certain embodiments, fenestrations are characterized by a circular cross-section having a diameter from about 50 μm to about 300 μm, from about 80 μm to about 250 μm, and in certain embodiments, from about 100 μm to about 200 μm.

In certain embodiments, ophthalmic lenses provided by the present disclosure include a sag height from about 3 mm to about 5 mm, in certain embodiments, from about 3.5 mm to about 4.5 mm, and in certain embodiments, from 3.5 mm to about 4.2 mm. The sag height refers to the distance from the center of the lens to a line extending from the peripheral edge of a lens. For a particular optic curvature, lenses may be provided with several different sag heights to accommodate different eyeball sizes among a general population of patients. For example, lenses having particular optic curvature may be provided with three different sag heights from a nominal sag height of 4.0 mm in steps from about 0.15 mm to 0.3 mm. For example, for lenses having a particular optic curvature, lenses having sag heights of 3.7 mm, 4.0 mm, and 4.3 mm can be provided. In certain embodiments, for lenses having a particular optic curvature, lenses having sag heights of 3.85 mm, 4.0 mm, and 4.15 mm; sag heights of 3.8 mm, 4.0 mm, and 4.2 mm; and in certain embodiments, sag heights of 3.75 mm, 4.0 mm, and 4.25 mm, can be provided.

In certain embodiments, an ophthalmic lens for correcting a refractive error of an eye, the eye having a cornea with a refractive shape extending across an optical region of the eye, comprises: an inner optic portion configured to be disposed over the optical region of the cornea; a posterior surface extending along the inner optic portion adjacent the eye when the inner portion is disposed over the optical region, the inner optic portion configured so that engagement of the posterior surface against the eye deforms the posterior surface and so that the posterior surface has a shape diverging from the refractive shape of the cornea; a peripheral portion of the ophthalmic lens disposed radially outward of the inner optic portion; and an anterior surface of the ophthalmic lens extending along the inner optic portion opposite the posterior surface configured to mitigate the refractive error; wherein, the inner optic portion is characterized by an inner rigidity and the peripheral portion is characterized by a peripheral rigidity; the inner rigidity is greater than the outer rigidity.

In certain embodiments of an ophthalmic lens, the inner optic portion is characterized by a substantially spherical profile.

In certain embodiments of an ophthalmic lens, the refractive error of the eye includes a cylindrical error; and the inner optic portion is characterized by a substantially spherical surface so that correction of the cylindrical error by the lens is primarily effected by the divergence of the shape of the inner optic portion from the refractive shape of the cornea.

In certain embodiments of an ophthalmic lens, the inner optic portion and the peripheral portion are configured to allow movement relative to the eye.

In certain embodiments of an ophthalmic lens, the inner optic portion and the peripheral portion are configured to provide a tear fluid flow between the inner optic portion of the ophthalmic lens and the cornea.

In certain embodiments of an ophthalmic lens, the refractive error of the eye comprises astigmatism; and the anterior surface of the inner optic portion and the posterior surface of the inner optic portion are radially symmetric.

In certain embodiments of an ophthalmic lens, the ophthalmic lens further comprises a plurality of fenestrations, wherein the plurality of fenestrations is disposed within the inner optic portion, the peripheral portion, or both the inner optic portion and the peripheral portion.

In certain embodiments of an ophthalmic lens, at least some of the plurality of fenestrations are disposed proximate an interface between the inner optic portion and the peripheral portion.

In certain embodiments of an ophthalmic lens, at least some of the plurality of fenestrations are configured to pump tear liquid between the posterior surface of the lens and the epithelium when the eye blinks.

In certain embodiments of an ophthalmic lens, at least some of the plurality of fenestrations are configured to maintain tear fluid within one or more lenticular volumes between the posterior surface of the inner optic portion and the cornea.

In certain embodiments of an ophthalmic lens, the inner optic portion is primarily configured to correct vision and the peripheral portion is primarily configured to enhance comfort.

In certain embodiments of an ophthalmic lens, the posterior surface of the inner optic portion comprises a thickness of a low modulus material.

In certain embodiments of an ophthalmic lens, the ophthalmic lens is characterized by a sagittal height (SAG) from 3 mm to 5 mm.

In certain embodiments of an ophthalmic lens, the anterior surface is characterized by a spherical profile without a cylindrical component.

In certain embodiments of an ophthalmic lens, the ophthalmic lens is configured to center on the optical region of the cornea following blinking of the eye.

In certain embodiments, methods for correcting a refractive error of an eye, the eye having a cornea with a refractive shape extending across an optical region of the cornea, comprise: positioning an ophthalmic lens on the eye so that an inner optic portion of the ophthalmic lens is disposed over the optical region of the cornea, wherein at least a portion of a posterior surface of the positioned ophthalmic lens extends adjacent the eye and is deformed by the eye; and wherein a shape of the posterior surface diverges from the refractive shape of the cornea so that the ophthalmic lens mitigates the refractive error.

In certain methods for correcting refractive error, the refractive error of the eye comprises astigmatism, spherical defocus, or a combination thereof; the ophthalmic lens further comprises a plurality of fenestrations, wherein the plurality of fenestrations is disposed within the inner optic portion, the peripheral portion, or both the inner optic portion and the peripheral portion; the inner portion of the ophthalmic lens is deformable and a peripheral portion of the ophthalmic lens disposed outward of the inner optic portion is characterized by a rigidity lower than a rigidity of the inner portion; and mitigation of the refractive error when viewing with the eye through the anterior surface is substantially independent of the shape of the peripheral portion throughout a range of astigmatic errors of at least about 1.5 D, and is independent of a rotational orientation of the ophthalmic lens about a viewing axis of the eye.

In embodiments in which the inner optic portion is configured to provide a spherical correction, the thickness of the inner portion will not be uniform, and will be shaped to provide, for example, a spherical power from about −3.00 D to about +3.00 D, and in certain embodiments, from about −10.00 D to about +10.00 D. In such embodiments, the thickness of the inner optic portion can taper from the center toward the peripheral portion depending on the spherical power.

In embodiments, in which correction of spherical power is not required, the thickness of the inner portion may be substantially uniform.

In certain embodiments, ophthalmic lenses are radially symmetric.

Certain embodiments of ophthalmic lenses provided by the present disclosure can be configured to provide one or more lenticular volumes between at least a portion of the posterior surface of the inner optic portion and the surface of the cornea.

When placed on the cornea, the posterior surface of the inner optic portion of the ophthalmic lens comprises a shape diverging from the refractive shape of the cornea and define a lenticular volume. In certain embodiments, at least a portion of the peripheral portion may also diverge from the refractive shape of the cornea and may define a lenticular volume. The peripheral portion of the lens may diverge from the refractive shape of the cornea near the interface of the inner optic portion and the peripheral portion. Depending upon the shape of the cornea, one or more lenticular volumes may be formed A lenticular volume defined by the peripheral portion of a lens may be fluidly connected to a lenticular volume defined by the inner portion and may facilitate exchange of tear fluid within one or more lenticular volumes. Tear exchange within a lenticular volume and to and from a lenticular volume may be facilitated by fenestrations through the ophthalmic lens. Such fenestrations may serve to pump tear fluid to and from a lenticular volume during blinking of the eye.

In certain embodiments, the inner optic portion comprises a shape configured to provide a spherical power to correct refractive error, and in certain embodiments, comprises a shape configured to correct non-spherical refractive error.

In certain embodiments, the anterior surface of the inner optic portion is characterized by a substantially spherical shape.

In certain embodiments, the posterior surface of the inner optic portion may be characterized by a substantially spherical shape.

In other embodiments, the posterior surface of the inner optic portion may be characterized by a non-spherical shape such as, for example, a toric shape. In embodiments in which the posterior surface is characterized by a toric shape, the shape can be configured such that the toric shape of inner optic portion aligns with an astigmatic axis of the cornea. The toric shape can be from 0.75 D to 1.25 D. The toric shape can reduce the lenticular volume compared to a spherical shape. The reduced lenticular volume results in less lens flexure of the contact lens during blinking. The tonic shape of the posterior surface can induce a certain amount of astigmatism.

The induced astigmatism by the toric shape of the posterior surface can be compensated by having an anterior surface with a toric shape. The amount of toricity of the posterior surface may be sufficient to correct any astigmatism induced by the toricity of the anterior surface of the lens. The anterior surface may also include a shape for spherical correction.

In certain embodiments, an ophthalmic lens will have a spherical power effect bitoric design that is independent of lens orientation.

In certain embodiments, the inner optic portion comprises a single material throughout the thickness.

In certain embodiments, the inner optic portion comprises more than one material, with different materials disposed in different axial portions of the inner optic portion. For example, the inner optic portion may comprise a first portion disposed toward and/or forming the anterior surface of the inner optic portion, toward and/or forming the posterior surface of the inner optic portion, or toward the center of the inner optic portion. In such embodiments, the first portion comprises a material characterized by a modulus higher than that of a material forming the peripheral portion. The first portion comprises a material and is characterized by a thickness sufficient to provide correction of refractive error.

By virtue of being characterized by at least different moduli, the material forming the first portion is not structurally the same as the anterior material and/or the posterior material, although the materials may be based on similar chemistries and/or materials. In certain embodiments, the anterior material can be the same as the posterior material and in certain embodiments the anterior material can be different than the posterior material. In certain embodiments, the anterior material, the posterior material, and the peripheral material are the same and the anterior material and the posterior material extend from the inner optic portion to the peripheral portion.

In certain embodiments, one or more surfaces of the first portion may be treated to enhance the mechanical integrity and/or adhesion of the interface with the first portion and the anterior portion and/or the posterior portion.

In certain embodiments, the inner optic portion, the peripheral portion, or both the inner optic portion and the peripheral portion may comprise one or more coatings on the anterior surface, the posterior surface, or both the anterior surface and the posterior surface.

The one or more coatings may be selected, for example, to improve comfort, to facilitate tear flow, and/or to modify the hydrophilicity/hydrophobicity of the lens or portion of the lens. The one or more coatings may be the same in both the inner optic portion and in the peripheral portion or may be different in different portions of the lens.

In certain embodiments, the materials forming the inner optic portion, the peripheral portion, or both the inner optic portion and the peripheral portion are non-hydrous. A non-hydrous material refers to a material characterized by a water content less than about 10 wt %, less than about 5 wt %, and in certain embodiments, less than about 1 wt % in its fully hydrated state.

A material may be intrinsically non-hydrous or may be rendered functionally non-hydrous by situating or encapsulating a material between non-hydrous materials and/or by a coating with a non-hydrous and/or hydrophobic material. For example, a hydrophobic coating such as a hydrocarbon or fluorocarbon coating may be used to prevent hydration of a hydrous material.

The material forming the inner optic portion and the peripheral portion may be characterized by the same or by a different water content.

In embodiments in which the inner optic portion comprises more than one axial portion, the first or optical portion may comprise a non-hydrous material and the anterior portion and/or posterior portions may comprise a hydrous material, such as a hydrogel.

The inner optic portion comprises an inner material characterized by an inner modulus, and the peripheral portion comprises a peripheral material characterized by a peripheral modulus, wherein the inner modulus is greater than the outer modulus.

The materials forming the inner optic portion and the peripheral portion may be polymers, copolymers, homopolymers, graft polymers, or graft copolymers. The materials may comprise a combination of more than one different type of materials. In certain embodiments, the materials may be hydrogels. A hydrogel refers to a cross-linked polymeric material, which is not water-soluble and contains at least 10 wt % water within the polymer matrix when fully hydrated. In certain embodiments, a material forming the inner optic portion and/or the peripheral portion is not a hydrogel and contains less than 10 wt % water.

Examples of suitable materials for forming the inner optic portion include, for example, silicones, fluorosilicones, polyurethanes, polyether block amides, polycarbonates, polymethyl methacrylates, polystyrenes, and acrylonitrile butadiene styrene, polymers of methacrylate and acrylate esters of various alcohols, including aliphatic, aromatic, siloxane-containing, fluorocarbon-containing alcohols, and combinations of any of the foregoing. Such materials for the inner optic portion are characterized by a modulus from about 100 MPa to about 3000 MPa.

Examples of suitable materials for forming the peripheral portion include, for example, silicone, silicone hydrogels, and hydrogels of optically clear materials such as those listed for the inner portion modified with a suitable hydrophilic material such as polyhydroxyethylmethacrylate hydrogels, polyvinylpyrrolidone hydrogels, polyvinylalcohol hydrogels, silicone hydrogels.

Ophthalmic lenses provided by the present disclosure may be manufactured using any suitable contact lens manufacturing technology including, for example, cast molding, injection molding, insert molding, transfer molding, thermoforming, vacuum forming, or a combination of any of the foregoing.

In certain embodiments, the inner optic portion comprising a higher modulus material may be thermoplastic and can be fabricated by injection molding. The inner optic portion may then be inserted into a mold cavity and the peripheral portion formed to retain the inner optic portion. This may be accomplished, for example, using insert molding or cast molding technologies. In certain embodiments, the material forming the peripheral portion also covers the anterior surface, the posterior surface, or both the anterior surface and the posterior surface of the inner portion. Cast molding resins may be, for example, heat cured or radiation cured such as UV cured.

Scaffolds provided by the present disclosure may be fabricated using any suitable technology. The technology may be selected as appropriate for the material or materials used to form the scaffold.

For example, scaffolds may be fabricated using injection molding, compression molding, thermoforming, a lathe, or cast molding.

The material forming the scaffold may be a thermoplastic or may be a curable liquid. A curable material may be curable by heat or by radiation.

The openings in the scaffold may be formed at the time the scaffold is fabricated or may be machined after the scaffold is formed. The openings may be incorporated into the mold design. The openings may also be machined after the part is formed using, for example, laser machining, die cutting, or other suitable method.

To fabricate a contact lens, the scaffold may be first positioned in a mold cavity and then a second material formed around the scaffold by injection molding, compression molding, cast molding or other suitable molding technology. The second material can form the anterior and posterior surface of the inner optic portion, fill the openings in the scaffold, and also form the peripheral portion of the contact lens.

In certain embodiments the low modulus material may be a thermoplastic and the contact lens formed by insert molding the scaffold.

For high volume manufacturing it may be desirable to position the scaffold in a cast mold, fill the mold with a liquid low modulus material, and cure the low modulus material using actinic radiation such as ultraviolet radiation.

While certain embodiments have been described in some detail, by way of example and for clarity of understanding, those of skill in the art will recognize that a variety of modifications, adaptations, and changes may be employed. Hence, the scope of the present invention should be limited solely by the appended claims.

What is claimed is:

1. An ophthalmic lens for correcting a refractive error of an eye, wherein the eye comprises a cornea, and the ophthalmic lens comprises:
    an inner optic portion configured to be disposed over an optical region of the cornea, wherein the inner optic portion comprises:
        an inner material; and
        a scaffold embedded within the inner material, wherein the scaffold comprises one or more openings; and
    a peripheral portion disposed radially outward of the inner optic portion.

2. The ophthalmic lens of claim 1, wherein, when applied to the eye, the inner optic portion comprises a posterior surface characterized by a shape diverging from a refractive shape of the cornea.

3. The ophthalmic lens of claim 1, wherein,
    the inner material is characterized by an inner material modulus;
    the scaffold comprises a scaffold material characterized by a scaffold modulus; and
    the scaffold modulus is greater than the inner material modulus.

4. The ophthalmic lens of claim 3, wherein the scaffold modulus is within a range from 300 MPa to 3000 MPa.

5. The ophthalmic lens of claim 3, wherein the inner material modulus is within a range from 0.1 MPa to 10 MPa.

6. The ophthalmic lens of claim 1, wherein the scaffold is characterized by a substantially uniform thickness.

7. The ophthalmic lens of claim 1, wherein the scaffold is characterized by a substantially uniform thickness ranging from 50 µm to 500 µm.

8. The ophthalmic lens of claim 1, wherein the scaffold represents from 20 vol % to 80 vol % of the volume of the inner optic portion.

9. The ophthalmic lens of claim 1, wherein the inner optic portion is characterized by a maximum thickness from 50 µm to 500 µm.

10. The ophthalmic lens of claim 1, wherein the inner optic portion is characterized by a rigidity from 1E9 MPa-µm$^3$ to 1E11 MPa-µm$^3$.

11. The ophthalmic lens of claim 1, wherein the inner optic portion is characterized by an oxygen transmissibility of at least 80 Dk/t.

12. The ophthalmic lens of claim 1, wherein the inner optic portion comprises an anterior surface and a posterior surface wherein each of the anterior surface and the posterior surface is characterized by a spherical profile.

13. The ophthalmic lens of claim 1, further comprising a plurality of fenestrations, wherein the plurality of fenestrations is disposed within the inner optic portion, within the peripheral portion, or within both the inner optic portion and the peripheral portion.

14. The ophthalmic lens of claim 1, wherein,
    the refractive error of the eye comprises astigmatism; and
    each of an anterior surface of the inner optic portion and a posterior surface of the inner optic portion is radially symmetric.

15. The ophthalmic lens of claim 1, wherein the one or more openings are filled with the inner material.

16. An ophthalmic lens for correcting a refractive error of an eye, wherein the eye comprises a cornea, and the ophthalmic lens comprises:
    an inner optic portion configured to be disposed over an optical region of the cornea, wherein the inner optic portion comprises:
        an inner material; and
        a scaffold embedded within the inner material; and
        a peripheral portion disposed radially outward of the inner optic portion;
    wherein each of the inner material and the scaffold material comprise similar material chemistries.

17. An ophthalmic lens for correcting a refractive error of an eye, wherein the eye comprises a cornea, and the ophthalmic lens comprises:
    an inner optic portion configured to be disposed over an optical region of the cornea, wherein the inner optic portion comprises:
        an inner material; and a scaffold embedded within the inner material; and a peripheral portion disposed radially outward of the inner optic portion;

wherein each of the inner material and the scaffold material comprises a hydrogel.

18. An ophthalmic lens for correcting a refractive error of an eye, wherein the eye comprises a cornea, and the ophthalmic lens comprises:

an inner optic portion configured to be disposed over an optical region of the cornea, wherein the inner optic portion comprises:

an inner material; and a scaffold embedded within the inner material; and a peripheral portion disposed radially outward of the inner optic portion;

wherein each of the inner material and the scaffold material is characterized by substantially the same refractive index within +/−0.02.

19. An ophthalmic lens for correcting a refractive error of an eye, wherein the eye comprises a cornea, and the ophthalmic lens comprises:

an inner optic portion configured to be disposed over an optical region of the cornea, wherein the inner optic portion comprises:

an inner material; and a scaffold embedded within the inner material; and a peripheral portion disposed radially outward of the inner optic portion;

wherein the inner optic portion is configured to maintain one or more lenticular volumes between a posterior surface of the inner optic portion and the optical region of the cornea.

20. An ophthalmic lens for correcting a refractive error of an eye, wherein the eye comprises a cornea, and the ophthalmic lens comprises:

an inner optic portion configured to be disposed over an optical region of the cornea, wherein the inner optic portion comprises:

an inner material; and a scaffold embedded within the inner material, wherein the scaffold comprises a scaffold material; and a peripheral portion disposed radially outward of the inner optic portion;

wherein the inner material and the scaffold material exhibit similar swelling when hydrated.

* * * * *